N. C. Sanford,

Skate.

No. 895. Reissued Feb. 7, 1860.

Witnesses;
B. Gnour
W. Thompson

Inventor;
N. C. Sanford

AM. PHOTO-LITHO. CO. N.Y. (OSBORNE'S PROCESS)

UNITED STATES PATENT OFFICE.

N. C. SANFORD, OF MERIDEN, CONNECTICUT.

IMPROVEMENT IN SKATES.

Specification forming part of Letters Patent No. 12,427, dated February 20, 1855; Reissue No. 895, dated February 7, 1860.

*To all whom it may concern:*

Be it known that I, N. C. SANFORD, of Meriden, in the county of New Haven and State of Connecticut, have invented certain new and useful Improvements in Skates; and I do hereby declare that the following is a full, clear, and exact description of the same, reference being had to the annexed drawings, making a part of this specification, in which—

Figure 1:
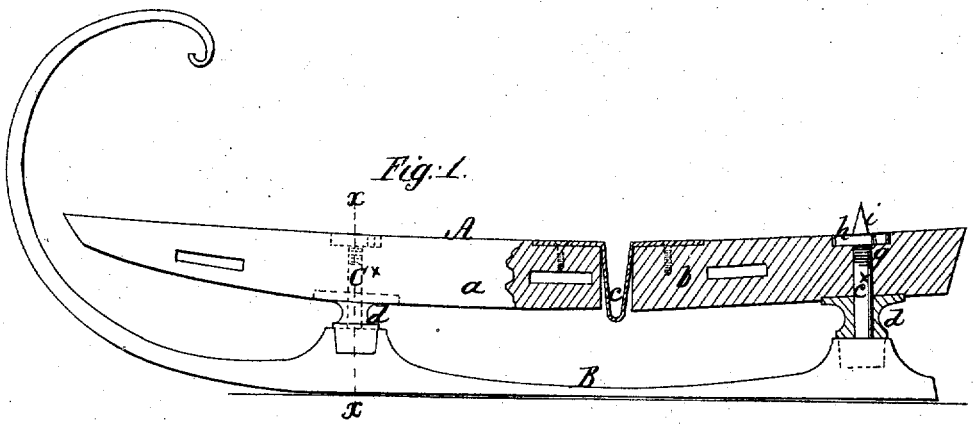
Figure 3:
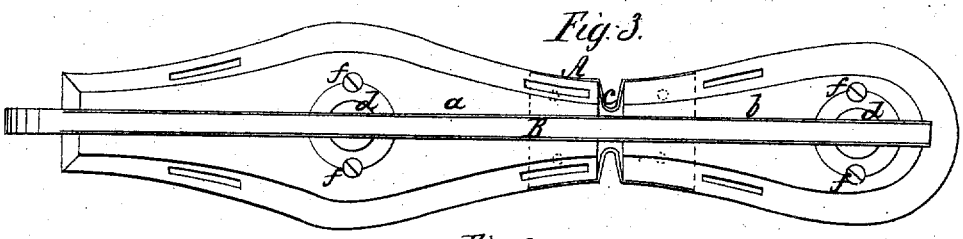
Figure 2:
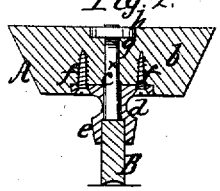

Figure 1 is a side-sectional view of a skate constructed according to my invention; Fig. 2, a transverse vertical section of same, taken in the line *x x*, Fig. 1; Fig. 3, an inverted plan of same.

Similar letters of reference indicate corresponding parts in the several figures.

This invention consists, first, in a novel way of connecting the runner of the skate to the stock, substantially as hereinafter fully shown and described, whereby a very firm and substantial connection is not only obtained, but also a very simple and economical one.

The invention consists, second, in having the stock of the skate formed of two parts connected by a spring and having the runner so made as to be elastic, as will be hereinafter shown, whereby the skate is made to yield or give, so that its back part will rise with the heel when the weight of the body is thrown upon the front part of the skate, upon which the ball or front part of the foot rests.

To enable those skilled in the art to fully understand and construct my invention, I will proceed to describe it.

A represents the stock of the skate, which stock is formed of two parts, *a b*, connected by a spring, *c*. This spring *c* may be constructed of steel or other suitable metal, and of a piece of plate of requisite thickness to insure a proper degree of elasticity and strength. The spring, it will be seen by referring to Fig. 1, is of U form between the two parts *a b*, and its outer parts are fitted flush in the upper surfaces of the inner parts of the two pieces *a b* of the stock. I do not, however, confine myself to this form of spring, although it would probably be as good as any.

B is the runner of the skate, which has two knees or posts, $c^{\times}$ $c^{\times}$, welded or attached permanently to it in any proper way. These knees or posts have each a socket, *d*, fitted on it. These sockets are grooved at their lower ends to fit on or receive the runner B, as shown clearly at *e* in Fig. 2, and the upper parts may be of circular form and of sufficient diameter to form good bearing-surfaces for the bottom of the stock. The sockets are attached at their upper parts to the under side of the stock by screws *f*.

The knees or posts $c^{\times}$ $c^{\times}$ extend entirely through the stock A, and they have screw-threads *g* formed on their upper parts to receive nuts *h*, which, when screwed fully down, fit in recesses in the upper surface of the stock so as to be flush therewith. The back knee or post $c^{\times}$ projects some distance above the stock to form a heel-spur, *i*. By screwing down the nuts *h* the stock is firmly secured between the nuts and the upper surfaces of the sockets.

The runner B is made sufficiently thin between the posts or knees $c^{\times}$ $c^{\times}$ to permit a requisite degree of elasticity, and this elasticity of the runner in connection with the forming of the stock of two parts connected by a spring enables the skate to yield or give to the movements of the foot, and is decidedly preferable to the rigid and inflexible skates in use. It is not so tiresome to the foot, and in other respects is more agreeable to the wearer.

The runner, of course, in all skates should be firmly attached to the stocks, but in consequence of the elastic feature herein shown in my improved skate, it is particularly essential that the runner be secured to the stock in a very durable manner, for the spring or elasticity of the runner exerts a great strain on the connection, and if the latter is not firm and durable it would soon work loose. By my mode of connecting the runner and stock such a contingency is avoided, and without increasing the cost of manufacture.

I do not claim merely forming the stock of two parts, for that has been previously done; but What I do claim as new, and desire to secure by Letters Patent, is—

1. Attaching the runner B to the stock A by means of the posts or knees $c^{\times}$ $c^{\times}$, welded or firmly connected to the runner and passing through the stock, and having screw-threads *g* formed on them to receive nuts *h*, in connection with the sockets *d*, or any suitable shoulder or bearing-surface placed on the posts or knees, substantially as described.

2. Having the stock A of the skate formed of wo parts, *a b*, connected by a spring, *c*, when said stock is combined or used in connection with an elastic or spring runner, B, for the purpose herein set forth.

N. C. SANFORD.

Witnesses:
B. GIROUSE,
W. THOMPSON.